United States Patent [19]

Haas et al.

[11] Patent Number: 4,829,652
[45] Date of Patent: May 16, 1989

[54] APPARATUS AND METHOD OF INSTALLING A GASKET IN A CHANNEL MEMBER

[75] Inventors: Adam J. Haas; Glenn E. Crabtree, both of Louisville, Ky.

[73] Assignee: General Electric Company, Louisville, Ky.

[21] Appl. No.: 198,833

[22] Filed: May 26, 1988

[51] Int. Cl.⁴ .............................................. B23P 11/02
[52] U.S. Cl. ........................................ 29/451; 29/235
[58] Field of Search ................... 29/451, 235; 49/285, 49/489, 490; 312/214

[56] References Cited

U.S. PATENT DOCUMENTS

| | | | |
|---|---|---|---|
| 2,761,199 | 9/1956 | Allen | 29/235 |
| 3,007,240 | 11/1961 | Heinrich | 29/235 |
| 3,284,886 | 11/1966 | Provencher | 29/235 |
| 3,798,739 | 3/1974 | Fritz | 29/235 |
| 4,169,305 | 10/1979 | Kruszona | 29/235 |
| 4,172,313 | 10/1979 | Takahashi | 29/235 |
| 4,190,943 | 3/1980 | Takahashi | 29/235 |

Primary Examiner—Timothy V. Eley
Attorney, Agent, or Firm—Frederick P. Weidner; Radford M. Reams

[57] ABSTRACT

Apparatus and method for installing an elongated stretchable gasket in a longitudinal channel member including a frame having a rail extending along the channel with the gasket being located between the rail and the channel. The rail has a series of spaced vertical bores normal to the gasket with pins receivable therein and retained for vertical up and down movement within the bores. Force is applied to the pins to move them normal to the gasket in a downward direction to contact the gasket and force the gasket into the longitudinal channel member. In this manner the gasket is forced into the channel member without stretching the gasket longitudinally along the channel member.

12 Claims, 6 Drawing Sheets

APPARATUS AND METHOD OF INSTALLING A GASKET IN A CHANNEL MEMBER

BACKGROUND OF THE INVENTION

The present invention relates to apparatus and method for installing an elongated stretchable gasket in a longitudinal channel member and more particularly to a gasket which is rectangular in shape such as a refrigerator door gasket and installing that gasket in channel members forming a rectangle secured to the refrigerator door adjacent the peripheral edges of the door.

A well known type of gasket assembly is shown and described in U.S. Pat. Nos. 4,469,383 and 3,359,053 assigned to the same assignee as the present invention. In those patents there is described a gasket of extruded resilient material such as rubber, polyvinyl chloride, or the like. The securement of the gasket to the refrigerator door is by means of a long metal retainer strip through which fastening screws will pass to anchor the retaining strip and gasket to the door. With such a prior art gasket assembly special skills and sometimes a lot of rework is required to overcome the inherent gasket mounting problems to make certain that the gasket is properly positioned on the refrigerator door to assure good thermal sealing characteristics. To overcome these difficulties a different type of gasket assembly and method was developed and is described in U.S. Pat. No. 4,644,698 assigned to the same assignee as the present invention. In that gasket assembly there is provided elongated channel members having top, bottom, and side walls secured to the door adjacent the peripheral edges and have spaced screw opening therealong for screws that secure the channel members to the door. The channel members have a slot along the top wall and the sealing gasket has a base portion with a downwardly projecting winged dart having a body and two diverging arms projecting through the open slot in the top wall of the channel member to secure the sealing gasket to the channel member.

One of the difficulties with the invention described in U.S. Pat. No. 4,644,698 and in other gasket asembling apparatus and methods is that in the process of forcing the gasket into the retainer channel the gasket tends to stretch longitudinally relative to the retainer channels. The stretching is undesirable particularly when the gasket is rectangular shaped with the four corners joined together. The stretching of the gasket tends to bunch the gasket up at the corners so that the desired fit of the gasket to the refrigerator door to provide good thermal sealing characteristics is detrimentally affected.

One of the most common ways of installing gaskets and weather stripping in channels is to use a roller. See for example U.S. Pat. Nos. 4,169,305; 4,172,313 and 4,528,736. The use of a roller, however, applies some force to the gasket which is not normal or perpendicular to the gasket, thus causing the gasket to stretch longitudinally along the channel. One way to eliminate a roller is disclosed in U.S. Pat. No. 3,027,629. The apparatus disclosed in U.S. Pat. No. 3,027,629 relates to putting weatherstripping on windows and doors. In that patent a reciprocatable hammer mounted on a permanent frame adjacent a conveyor punches the weatherstripping at an acute angle to the groove in which the weatherstripping is to be seated.

By this invention, there is provided an apparatus and method for installing an elongated stretchable gasket in a longitudinal channel member whereby the gasket is forced into the channel member without stretching the gasket longitudinally along the channel member.

SUMMARY OF THE INVENTION

Apparatus and method is provided for installing an elongated stretchable gasket in a longitudinal channel member comprising a frame having a rail extending along the channel with the gasket being located between the rail and the channel. There is a series of spaced vertical bores along and through the rail normal to the gasket and a series of pins receivable in the vertical bores and retained therein for vertical up and down movement within the bores. Force is applied to the pins to move them normal to the gasket in a downward direction to contact the gasket and force the gasket into the longitudinal channel member. With this apparatus and method the gasket is forced into the channel member without stretching the gasket longitudinally along the channel member.

DESCRIPTION OF THE PREFERRED EMBODIMENT

Figure 1:
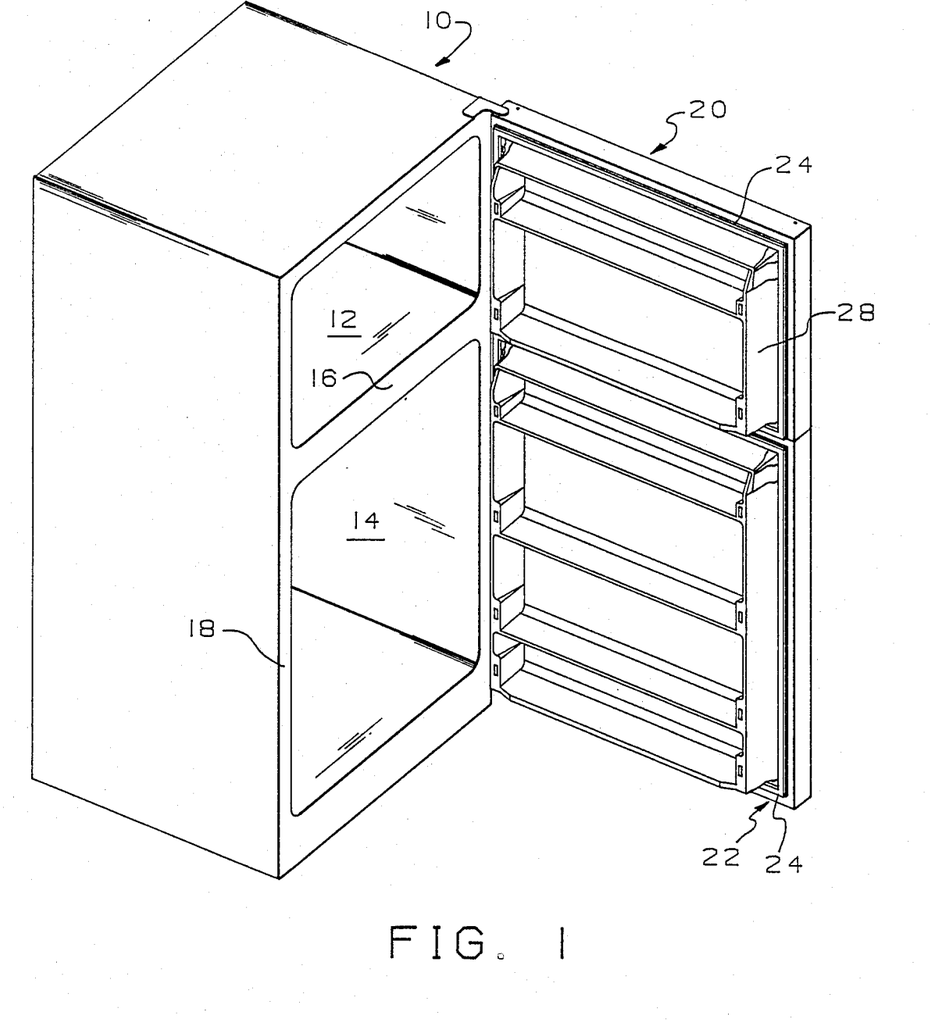
FIG. 1 is a perspective view of a household refrigerator showing a gasket assembly in place on the refrigerator doors.

With reference to FIG. 1, there is shown a household refrigerator 10 with a cabinet 11 having a freezer compartment 12 located at the top of the cabinet and a fresh food compartment 14 located at the bottom of the cabinet with a thermal insulation mullion partition 16 between the two compartments to insulate one relative to the other. Around the front opening of the refrigerator compartments is a front face 18. Hingedly secured to the cabinet 11 is a freezer door 20 and a fresh food door 22. Both doors have a gasket 24 which is made of stretchable or resilient polyvinyl chloride material and has enclosed within the gasket a strip of magnetic material so that when the door is closed the gasket will be attracted to the front face 18, thus thermally sealing the respective compartment. For the purposes of this invention there needs to be described only one of the doors, as the apparatus and method of assembling the gasket to the door is the same whether it be for the freezer door or fresh food door.

Figure 2:
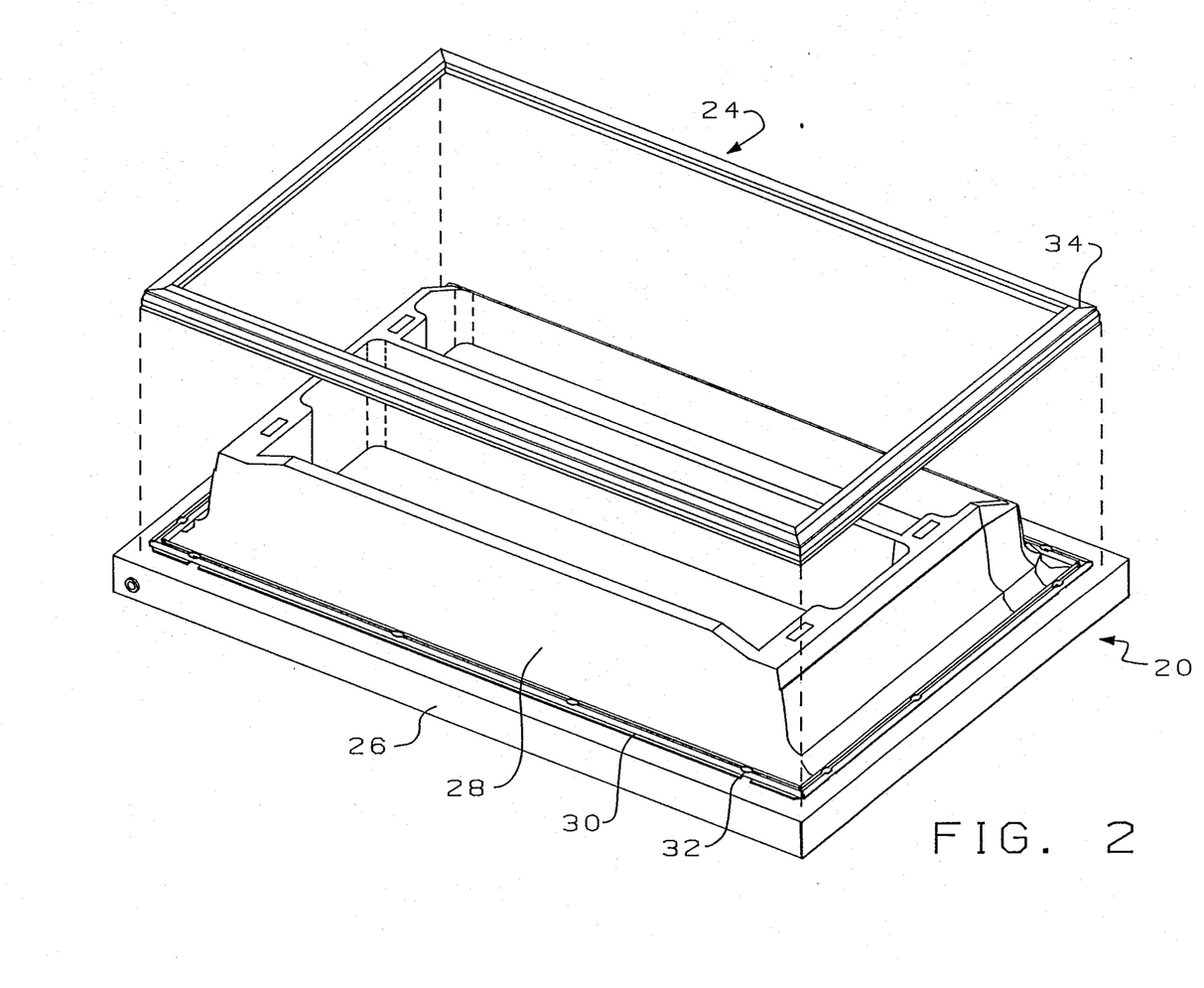
FIG. 2 is an exploded perspective view of a gasket assembly and door for a refrigerator.

With reference to FIG. 2, the freezer door 20 is shown during its assembly and prior to being hingedly secured to the refrigerator cabinet and includes an outer metal shell 26 and a plastic vacuum formed inner door or liner 28 which has various configurations to form shelves on which food items may be stored. Between the door liner 28 and the outer metal shell 26 is thermal insulation (not shown) so that the refrigerator compartment, the freezer in this case, may be maintained at its proper temperature which is usually around 0° F. with a minimum of thermal leakage. In the case of the preferred embodiment, there are gasket retainer channel members 30 secured on all four sides of the rectangular shape door near the periphery of the door and are retained by screws (not shown) through screw holes 32 in the gasket retainer channel members 20. With this type of gasket retainer assembly, such as the one that is described in U.S. Pat. No. 4,644,698, the gasket retainer and screws secure the door liner 28 to the outer metal shell 26. The gasket is elongated and made of stretchable material and is rectangular in shape with the corners 34 joined, usually as a mitered joint. It will be noted that the longitudinal dimensions of each side of the gasket 24 is the same as the longitudinal dimensions of the channel members forming each side of the rectangular shaped gasket retainer. The gasket 24 is placed over the channel members 30 for securement thereto.

Figure 5:
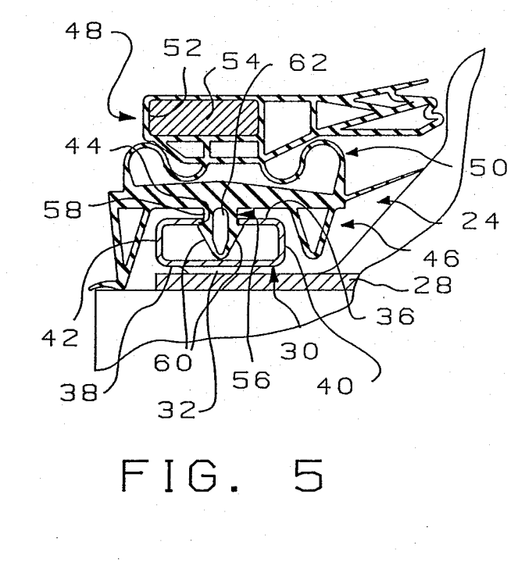
FIG. 5 is a cross-sectional view of a gasket assembly to which the present invention relates.

With reference ot FIG. 5, the gasket 24 and the channel member 30 are shown in cross-section after installation of the gasket. The channel member has a top wall 36, a bottom wall 38, and side walls 40 and 42. The channel member has countersunk spaced screw openings or holes 32 in the bottom wall 38. The top wall 36 of the channel member has an open slot 44 along the length of the channel member. The gasket 24 includes, as viewed in lateral cross-section in FIG. 5, a base portion generally indicated as 46 and a cabinet engaging portion generally indicated as 48 with an intermediate bellows type flexible portion 50 interconnecting the base portion 46 and the cabinet engaging portion 48. The cabinet engaging portion 48 has a cavity 52 which contains a strip of magnetic material 54 which when the door is closed will be attracted to the front face 18 of the cabinet 11 and is the sole means for maintaining the door in a closed position. The base portion 46 of the gasket has a downwardly projecting winged dart 56 having a body 58 and two diverging arms 60 and the center of the winged dart 56 has a hollow cavity 62.

The gasket 24 is secured to the channel members 30 by inserting the winged dart 56 through the slot 44 in the top wall 36 of the channel members. The snapping-in of the gasket to the channel members may be easily accomplished because the hollow cavity 62 allows the body 58 and diverging arms 60 to be slightly collapsed and pass through the slot opening until the diverging arms are within the channel members whereupon the elastic material re-forms to the shape shown in FIG. 7. It will be noted that the body 58 of the winged dart 56 spans the distance between the edges of the slot 44 and that the diverging wings extend outwardly of the edges of the open slot 44 to be retained by the underside of the top wall 36 of the channel members. The gasket is a continuous rectangle in shape, that is, it's like a four-sided picture frame with the corners being mitered and joined together. Because the gasket is rectangular shaped and having the same longitudinal length or dimension as each of the channel members, it is important that during the installation of the gasket into the channel members that the gasket be pressed or forced in such a manner that the winged dart is inserted through the slot for its proper positioning yet at the same time not stretching the gasket longitudinally along the channel members. The following is a description of the apparatus and method utilized to prevent such stretching of the gasket during installation in the channel members.

Figure 3:
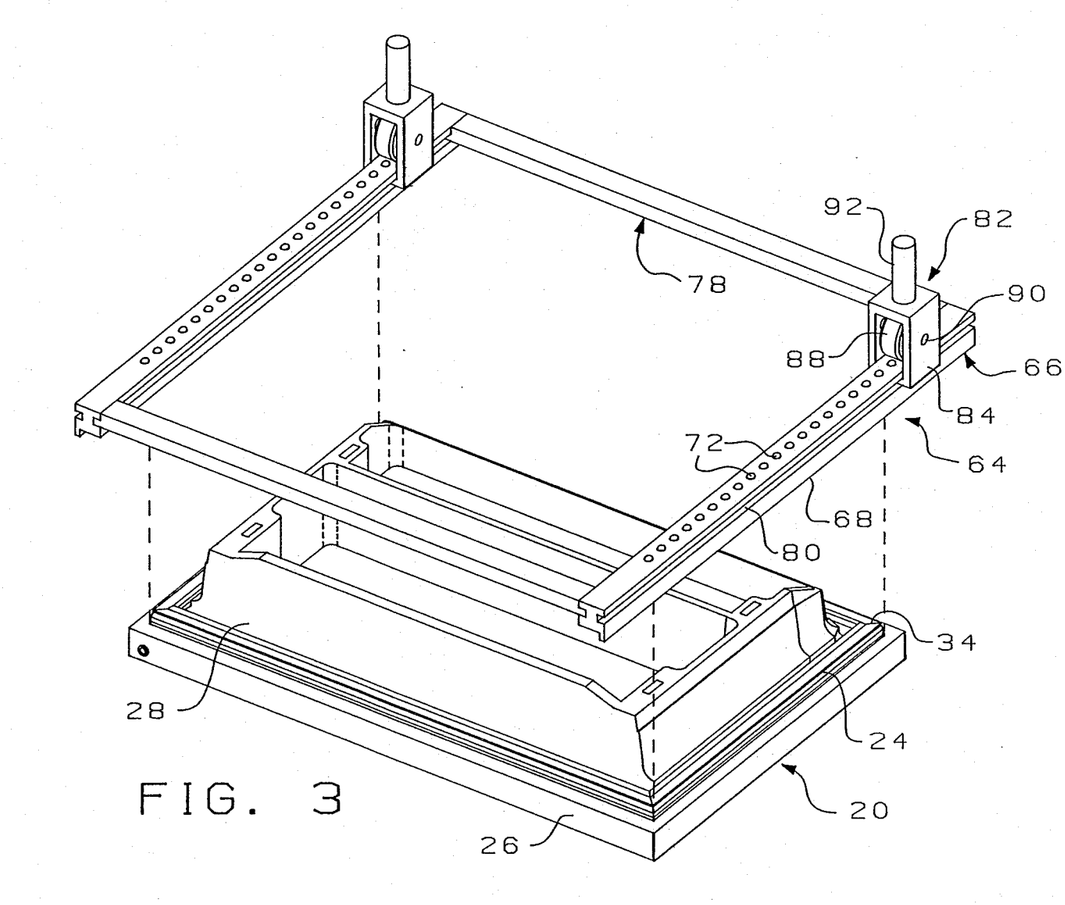
FIG. 3 is an exploded perspective view showing a gasket assembly and door for a refrigerator with the apparatus of the present invention.
Figure 4:
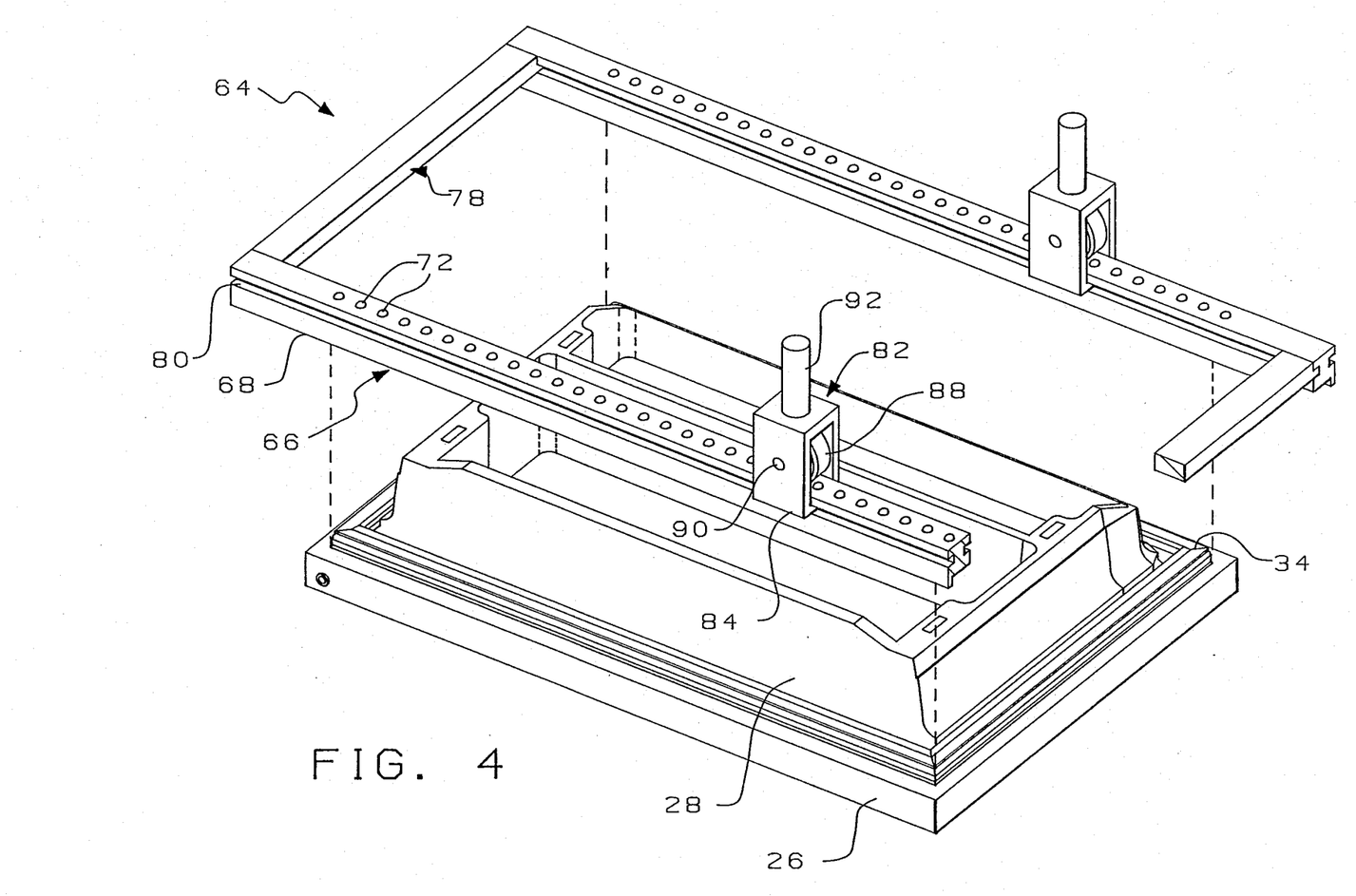
FIG. 4 is similar to FIG. 3 but showing a different orientation of the apparatus of the present invention.
Figure 6:
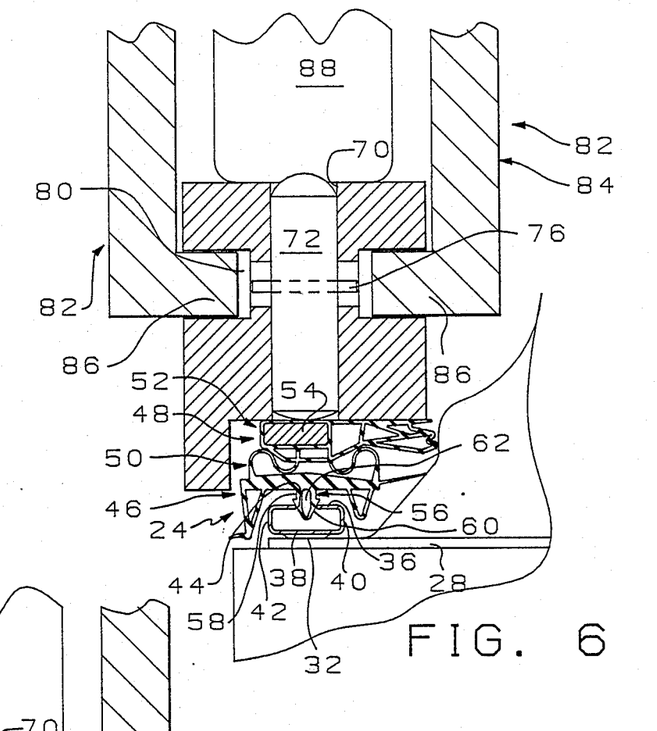
FIG. 6 is a cross-sectional view showing the apparatus of the present invention and a refrigerator door gasket ready for installation into a channel member on a refrigerator door.
Figure 7:
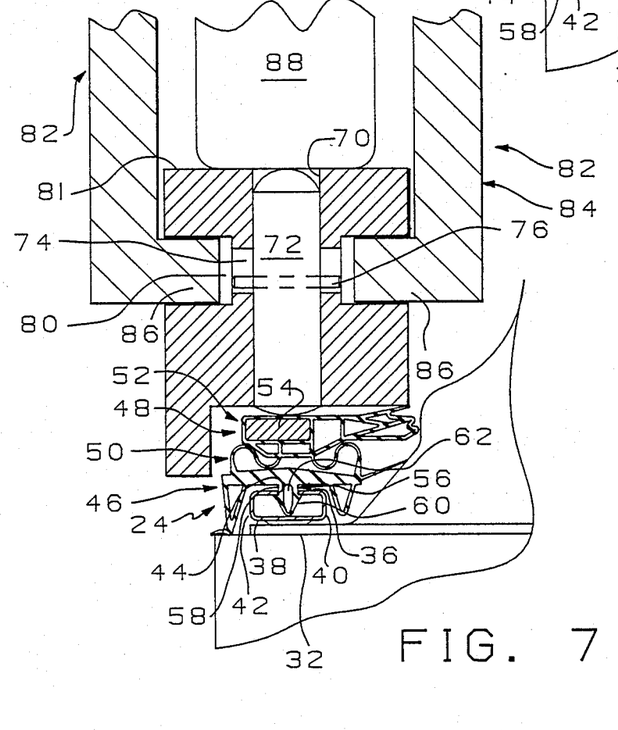
FIG. 7 is a cross-sectional view showing the apparatus of the present invention and a refrigerator door gasket installed in a channel member on a refrigerator door.
Figure 8:
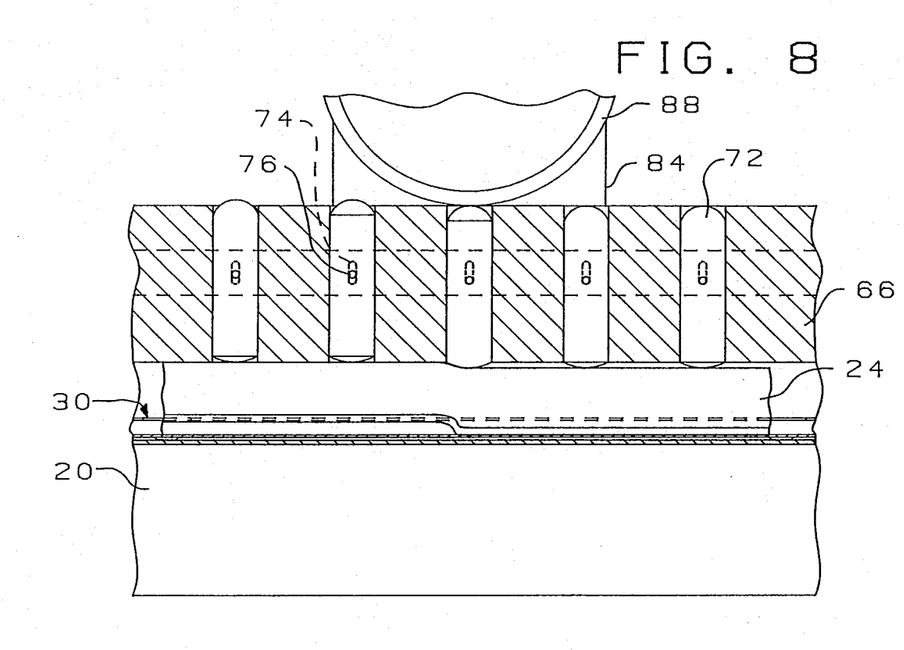
FIG. 8 is a cross-sectional view of the apparatus of the present invention and a gasket assembly for a refrigerator door.

With reference ot FIGS. 3-7, the apparatus 64 for installing the elongated stretchable gasket 24 into the longitudinal channel members 30 in the preferred embodiment is shown and includes a frame 66 having a rail 68 extending along one of the channel members 30 with the gasket 24 located between the rail 68 and the channel member 30 (FIGS. 6-8). As shown in FIGS. 3 and 4, there are two rails, one for each of the two opposite parallel sides of the gasket 24; however, since both are structurally the same and function in the same manner only one rail and its attendant components will be described. The rail 68 has a series of spaced vertical bores perpendicular or normal to the gasket (FIGS. 6-8). The bores have a series of pins 72 (FIGS. 6-8) which are receivable in the vertical bores 70 and retained therein for vertical up and down movement within the bores. In the case of the preferred embodiment, the rail 68 has retainer slots 74 (FIGS. 6-8) and the pins 72 have retainer rods 76 through the pins 72, which retainer rods 76 are secured to the pins 72 and extend beyond the circumference of the pins and into the retainer slots 74. With this arrangement, the pins 72 are restricted in their up and down movement within the bores by the dimensions of the retainer slots 74. As mentioned above, the apparatus shown in FIGS. 3 and 4 has two parallel rails 68 and these rails are retained a fixed distance apart by frame spacer emmbers 78. It will be understood that the two parallel rails 68 and the two parallel spacer members 78 form a rectangle and that each side of the rectangle has the same longitudinal dimensions as the rectangular gasket 24 which in turn has the same longitudinal dimensions as the rectangular retainer channel members 30.

Each of the rails 68 have guide grooves 80 and preferably a longitudinal guide groove on each side of the rail so that the rail in cross-section has the appearance of an I-beam (FIGS. 6 and 7). Riding on the top wall 81 of each of the rails 68 is a roller assembly 82 which includes a U-shaped roller housing 84 that has at its free ends spaced apart inwardly turned sections 86 as shown in FIGS. 6 and 7. These inwardly turned sections 86 are received in the guide grooves 80 of the rail 68 so that the housing 84 may be moved along the top of the rail 68 and retained thereon by cooperation between the inwardly turned sections 86 of the housing 84 and the guide grooves 80. The roller housing contains a roller 88 which has its axle 90 secured to the sides of the roller housing. With this arrangement when the roller housing is moved along the rail 68 the roller will rotate along on top of the rail 68. There is also a handle 92 secured to the top of the roller housing so that an operator may manually grip the handle and move the housing and roller along the top of the rail 68.

There will now be described the method of installing a stretchable four-sided rectangular shaped refrigerator door gasket 24 having a winged dart projection 56 into channel members 30 having a top wall 36, a bottom wall 38 and side walls 40 and 42 with the top wall having an open slot 44, which channel members are secured to a rectangular shaped refrigerator door 20 adjacent the peripheral edges thereof, said gasket and channel members having the same longitudinal dimensions. The gasket is placed along and above the longitudinal channel members 30 (FIG. 2) and the apparatus 64 for installing the gasket including frame 66 with a rail 68 and the roller housing 84 with roller 88 is positioned along and above two opposite parallel sides of the gasket 24 as shown in FIG. 3. Force is applied to the top of the pins 72 of one set of rails above the opposite sides of the gasket as shown in FIG. 3, which force is applied by manually moving the roller housing 84 and roller 88 along the rail so that the roller strikes the top of the pins successively to move the pins downwardly normal to the gasket to contact the gasket and force the diverging arms 60 of the winged dart projection 56 of the gasket through the open slot 74 into the channel members. In the preferred embodiment shown, the door 20 is moved to a second assembly station (FIG. 4) that has apparatus 64 for installing the gasket similar to that described in connection with FIG. 3. The difference is that the rails 68 of this frame 66 are along and above the opposite sides of the gasket from that of the first staion and again the roller housing and roller are moved along the top of the rails to contact the pins and move them downwardly normal to the gasket to contact the gasket and force the gasket into the other channel members.

In the preferred embodiment there are two assembly stations, namely a first staion as shown in FIG. 2 to install the short sides of the rectangular shaped gasket and a second station shown in FIG. 4 that will install the long sides of the rectangular shaped gasket. This procedure could be reversed, that is, the long sides could be installed first. It will be understood that, if desired, the installation of the gasket in the channel members utilizing this invention could be done in a single station by structural rearrangement of the frame 66. It will also be understood that while the roller and roller housing are moved along the rail manually that such an operation could be automated. In addition, while the frame 66 may be manually placed in position over the gasket it may also be done mechanically by any suitable equipment that will raise and lower the frame.

The preferred embodiment describes the invention relative to a rectangular shaped refrigerator gasket being installed into rectangular shaped channel members on a refrigerator door. The invention, however, may be used for other type gaskets or weatherstripping which are to be installed in a channel member in other type products where longitudinal stretching of the gasket or weatherstripping relative to the channel member is desirably avoided. The channel member may be a separate member as in the case of the preferred embodiment or an integral portion of an article or product that needs to have a gasket installed therein. In some applications there may be only a single length of gasket to be installed in a single channel member. In other applications two or more lengths of gasket may be installed in two or more channel members.

While, in accordance with the Patent Statutes, there has been described what at present is considered to be the preferred apparatus and method of the invention, it will be obvious to those skilled in the art that various changes and modifications may be made thereto with departing from the invention. It is, therefore, intended by the appended claims to cover all such changes and modifications as fall within the true spirit and scope of the invention.

What is claimed is:

1. Apparatus for installing an elongated stretchable gasket in a longitudinal channel member comprising:
    a frame having a rail;
    a series of spaced vertical bores along the rail;
    a series of pins receivable in the vertical bores and retained therein for vertical up and down movement within the bores;
    means to locate the gasket and channel member underneath and parallel to the rail with the gasket being between the rail and channel member, and
    means to apply force to the pins to move them normal to the gasket in a downward direction to contact the gasket and force the gasket into the longitudinal channel member, whereby the gasket is forced into the channel member without stretching the gasket longitudinally along the channel member.

2. The apparatus according to claim 1 wherein the gasket to be installed in the underlying longitudinal channel member is rectangular in shape with four sides, there are four longitudinal channel members forming a rectangle into which the gasket is installed and the frame located above the gasket has four rails forming a rectangle with a series of spaced vertical bores along each rail.

3. The apparatus of claim 1 wherein the means to apply force to the pins to move them in a downward direction is a roller contacting successively the end of each pin remote from the end of the pin contacting the gasket.

4. The apparatus of claim 3 wherein the rail has longitudinal grooves and there is a housing movable along the rail and guided therealong by said grooves and said housing retains the roller for rotational movement along the rail.

5. The apparatus of claim 1 wherein the elongated channel member has top, bottom and side walls and the top wall has an open slot and the gasket has a winged dart projection, said dart projection being forced through the slot of the channel member upon downward movement of the pins against the gasket.

6. The method if installing an elongatd stretchable gasket in a longitudinal channel member comprising:
    placing the gasket along and above the channel;
    positioning apparatus for installing the gasket including a frame with a rail along and above the gasket, said rail having a series of spaced vertical bores normal to the gasket with pins retained therein and movable up and down within the bores; and
    applying force to the pins to move them normal to the gasket in a downward direction to contact the gasket and force the gasket into the longitudinal channel member, whereby the gasket is installed in the channel member without stretching the gasket longitudinally along the channel.

7. The method of installing an elongated stretchable gasket in a longitudinal channel member according to claim 6 wherein the force is applied to the pins by moving a roller along the rail to engage the pins successively.

8. The method of installing a stretchable gasket having four sides and being rectangular in shape into four longitudinal channel members forming a rectangle and having the same longitudinal dimensions as the gasket comprising:
    placing the four sided gasket along and above the four longitudinal channel members;
    positioning apparatus for installing the gasket including a frame with a rail along and above each of the sides of the gasket, said rails having a series of spaced vertical bores normal to the gasket with pins retained therein and movable up and down within the bores;

applying force to the pins of one set of rails above opposite sides of the gasket and subsequently applying force to the other set of rails above the other opposite sides of the gasket to move the pins downwardly normal to the gasket to contact the gasket and force the gasket into the channel members.

9. The method of installing a stretchable four sided rectangular shaped refrigerator door gasket having a winged dart projection into channel members having top, bottom and side walls with the top wall having a slot, said channel members being secured to a rectangular shaped refrigerator door adjacent the peripheral edges thereof, said gasket and channel members having the same longitudinal dimensions comprising:

placing the gasket along and above the longitudinal channel members;

positioning apparatus for installing the gasket including a frame with a rail along and above each of the sides of the gasket, said rails having a series of spaced vertical bores normal to the gasket with pins retained therin and movable up and down within the bores;

applying force to the pins of one set of rails above opposite sides of the gasket and subsequently applying force to the other set of rails above the other opposite sides of the gasket to move the pins downwardly normal to the gasket to contact the gasket and force the gasket into the channel members.

10. The method of installing the gasket in a longitudinal channel member according to claim 9 wherein the force is applied to the pins by moving a roller along the rail to engage the pins successively.

11. The method of assembling a refrigerator door wherein a stretchable four sided rectangular shaped refrigerator door gasket having a winged dart projection is installed into channel members having top, bottom and side walls with the top wall having a slot, said channel members being secured to a rectangular shaped refrigerator door adjacent the peripheral edges thereof, said gasket and channel members having the same longitudinal dimensions comprising:

moving the refrigerator door to a first station;

placing the gasket along and above the longitudinal channel members;

positioning apparatus for installing the gasket including a frame with a rail along and above each of two opposite sides of the gasket, said rails having a series of spaced vertical bores normal to the gasket with pins retained therein and movable up and down within the bores;

applying force to the pins of the rails to move them normal to the gasket in a downwardly direction to contact the gasket and force the gasket into the underlying channel members;

removing the frame from above the gasket;

moving the rerigerator door to a second station;

positioning apparatus for installing the gasket including a frame with a rail along and above each of the other two opposite sides of the gasket, said rails having a series of spaced vertical bores normal to the gasket with pins retained therein and movable up and down within the bores; and applying force to the pins of the rails to move them normal to the gasket in a downward direction to contact the gasket and force the gasket into the underlying channel members.

12. The method of assembling a refrigerator door according to claim 11 wherein the force is applied to the pins by a roller along the rail to engage the pins successively.

* * * * *